(12) United States Patent
Fugleberg et al.

(10) Patent No.: US 6,340,450 B1
(45) Date of Patent: Jan. 22, 2002

(54) METHOD FOR LEACHING ZINC CONCENTRATE IN ATMOSPHERIC CONDITIONS

(75) Inventors: Sigmund Fugleberg, Turku; Aimo Järvinen, Kokkola, both of (FI)

(73) Assignee: Outokumpu Oyj (FI)

( * ) Notice: Subject to any disclaimer, the term of this patent is extended or adjusted under 35 U.S.C. 154(b) by 0 days.

(21) Appl. No.: 09/230,859

(22) PCT Filed: Aug. 11, 1997

(86) PCT No.: PCT/FI97/00469

§ 371 Date: Sep. 7, 1999

§ 102(e) Date: Sep. 7, 1999

(87) PCT Pub. No.: WO98/06879

PCT Pub. Date: Feb. 19, 1998

(30) Foreign Application Priority Data

Aug. 12, 1996 (FI) .................................................. 963154

(51) Int. Cl.$^7$ ............................ C22B 19/00; C01G 49/00
(52) U.S. Cl. .................... 423/109; 423/145; 423/146
(58) Field of Search ................................ 423/109, 145, 423/146

(56) References Cited

U.S. PATENT DOCUMENTS

| | | | | |
|---|---|---|---|---|
| 4,128,617 A | * | 12/1978 | DeGuire et al. | ............. 423/109 |
| 5,453,253 A | * | 9/1995 | Von Ropenack et al. | ... 423/138 |
| 5,651,947 A | * | 7/1997 | Collins et al. | ............. 423/109 |
| 5,858,315 A | * | 1/1999 | Van Put et al. | ............. 423/109 |

FOREIGN PATENT DOCUMENTS

| | | | |
|---|---|---|---|
| DE | 126074 | * | 6/1977 |
| WO | 95/06140 | * | 3/1995 |

* cited by examiner

*Primary Examiner*—Steven Bos

(57) ABSTRACT

The invention relates to a method for leaching zinc concentrate in atmospheric conditions in the presence of trivalent iron. It is essential that the zinc concentrate is fed into conditions where in addition to trivalent iron, there are also jarosite nuclei. The sulfuric acid content of the leaching step is maintained within the region 10–40 g/l, and the temperature within the region 80° C.—the solution boiling point, and into the leaching step there is fed oxygen, so that the zinc concentrate is dissolved and the iron is precipitated as jarosite.

3 Claims, 3 Drawing Sheets

METHOD FOR LEACHING ZINC CONCENTRATE IN ATMOSPHERIC CONDITIONS

Figure 1:
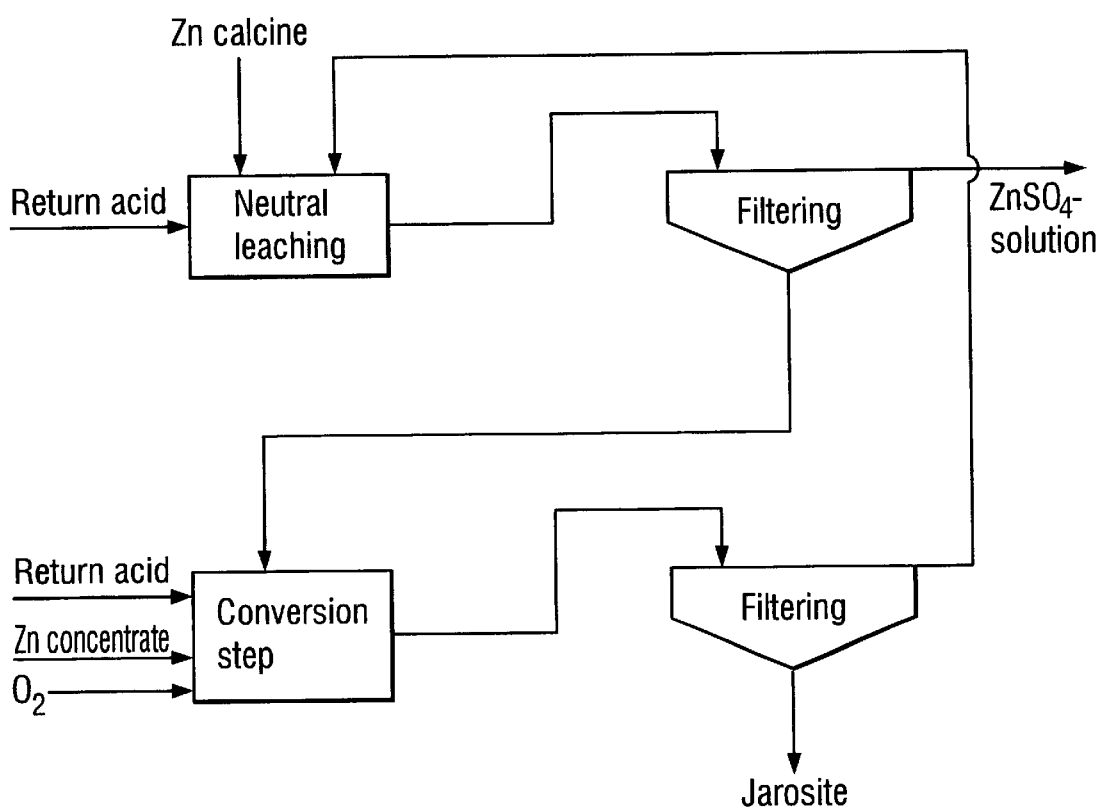

The present invention relates to a method for leaching zinc concentrate in atmospheric conditions, so that the obtained end product is a zinc sulfate solution, which is further conducted into electrolysis, and iron precipitate, which advantageously is jarosite precipitate.

In the prior art, there is known a method described in the EP patent publication 451,456, according to which zinc concentrate is roasted by conventional methods and conducted into neutral leaching. The ferrite that is left undissolved is conducted into strong-acid leaching, and into the strong-acid leaching step there is also fed bulk concentrate, which contains, in addition to zinc sulfide, also lead and precious metals. In the neutral leaching step, the zinc oxide of the calcine dissolves into zinc sulfate and is conducted to electrolysis after the purification steps. In the strong-acid leaching step, there is created a precious metals and lead containing precipitate, which is conducted either to pyrometallurgical treatment or to flotation in order to recover the precious metals and lead. The solution created in the strong-acid leaching step also contains the dissolved iron in ferrous form, wherefore the solution is conducted into iron removal, which according to the invention is carried out in an autoclave and in oxidizing conditions, and the iron is precipitated as hematite. The solution from which the iron is separated is then conducted to the neutral leaching step. This method is particularly applicable when the zinc concentrate contains precious metals and lead.

In the prior art there is also known the method described in the U.S. Pat. No. 4,676,828, where part of the concentrate is roasted and part subjected to direct leaching. The roasted part of the concentrate is dissolved in a two-step neutral leaching, and the undissolved ferrites are conducted to a multi-step direct leaching of the zinc concentrate. At least one step of the direct leaching takes place at heightened pressure and temperature, which increases the costs of the process. The valuable metals of the concentrate are separated from the direct leaching precipitate, and the dissolved iron is precipitated from the zinc sulfate solution by means of a calcine addition. Iron is precipitated as goethite.

From the U.S. Pat. No. 4,274,931 there is known the recovery of zinc from zinc sulfide concentrate; zinc concentrate is leached in conditions where the temperature is within the region of 70–119° C., the quantity of iron and other impurities is 5–50 g/l and the quantity of sulfuric acid 20 g/l at maximum. Leaching takes place in two steps, in the first of which the concentrate is leached with solution obtained from the second leaching step, so that there occurs a simultaneous leaching of the zinc contained in the concentrate and a partial precipitation of the iron contained in the solution, and in the second step there occurs a simultaneous leaching of the iron precipitate and of the concentrate that was left undissolved into he first step. From the first leaching step there is obtained a sulfate solution containing zinc and iron. This solution is conducted into the zinc calcine leaching circuit, where iron is precipitated by neutralizing it with the zinc calcine, whereafter the rest of the impurities are removed and the solution conducted into electrolysis. The leaching precipitate of the first step, which still contains some undissolved concentrate and precipitated iron, is in the second step subjected to leaching with the return acid from the electrolysis. Moreover, oxygen is fed to this step. From the precipitate left from the second step leaching, there is separated elemental sulfur and undissolved sulfide by means of flotation.

The U.S. Pat. No. 3,959,437 describes an extremely economical method for recovering zinc form roasted zinc concentrate. The zinc oxide of the calcine is leached in a neutral leaching step, and the ferrites that are left undissolved in this step are leached in a separate conversion step, where there is simultaneously carried out both the leaching of ferrite and the precipitation of iron as jarosite.

As was already mentioned in the references above, the dissolution of zinc sulfide concentrate in a sulfuric acid solution occurs through intermediation of trivalent iron according to the following reaction equations:

$$ZnS + Fe_2(SO_4)_3 \rightarrow ZnSO_4 + FeSO_4 + S^0 \quad (1)$$

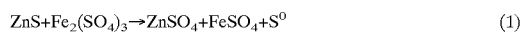

The created bivalent iron is regenerated by means of oxygen:

$$2FeSO_4 + H_2SO_4 + \tfrac{1}{2}O_2 \rightarrow Fe_2(SO_4)_3 + H_2O \quad (2)$$

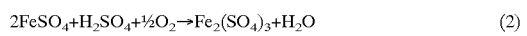

FeS, which is in the zinc sulfide lattice, reacts in similar fashion as zinc sulfide:

$$FeS + Fe_2(SO_4)_3 \rightarrow 3\,FeSO_4 + S^0 \quad (3)$$

The ferrous iron obtained into the solution must be precipitated, and this can be carried out either as goethite, jarosite or hematite. If iron should be very far precipitated as goethite, as is described in the U.S. Pat. No. 4,274,931, the pH must be raised high with respect to the iron precipitation conditions, and in such conditions zinc is dissolved very slowly. This means that iron must be precipitated in a separate step by using for instance zinc calcine as precipitation agent, as is done in point 8 of said U.S. patent.

Hematite can be precipitated in a higher acid content than goethite, and so that zinc sulfide dissolves effectively and serves as the neutralizing agent, as is described in the EP patent 451,456, but then autoclave conditions must be applied.

The precipitation of iron as jarosite may take place in atmospheric conditions with an acid content that is so high that zinc sulfide is dissolved, if the rest of the conditions are arranged in a favorable manner. As is well known, iron is precipitated as jarosite in atmospheric conditions (low temperatures) very slowly, and the precipitation is surface-activated. In order to achieve a sufficient precipitation speed, it is advantageous, particularly with higher acid contents, that an adequately high jarosite concentration exists in the precipitation situation. This is achieved for example by recirculating jarosite, as is described for instance in the Canadian patent 1,094,819.

The present invention relates to a method for leaching zinc concentrate in atmospheric conditions in the presence of trivalent iron. It is essential that the zinc concentrate is fed into conditions where in addition to trivalent iron, there are also present jarosite nuclei, where the sulfuric acid content of the leaching step is kept in the region 10–40 g/l and the temperature in the region 80° C.—the solution boiling point, and where into the leaching step there is fed oxygen, so that the zinc concentrate is dissolved and the iron is precipitated as jarosite. The essential novel features of the invention are apparent from the appended patent claims.

We have now proved that it is advantageous to feed the zinc concentrate to a conversion process, where the zinc contained in the concentrate is leached and the iron is precipitated simultaneously. In that case the concentrate is fed directly to the conversion step. From the point of view of zinc recovery, this method is an huge improvement, because now the leaching can be combined with the conversion step, and a complicated process is not needed at all. The method is as simple as the conversion method, and the recovery as good. This method also enables an improved recovery of zinc from ferrite, because in the novel method the acid level of the final part of the conversion step can be raised, because the iron precipitation need not be brought as far as in a conventional conversion process, because the rest of the iron can be precipitated in connection with the leaching of the zinc concentrate. The elemental sulfur created in the leaching of the zinc concentrate is either conducted to the jarosite residue or recovered as a separate process step.

Figure 2:
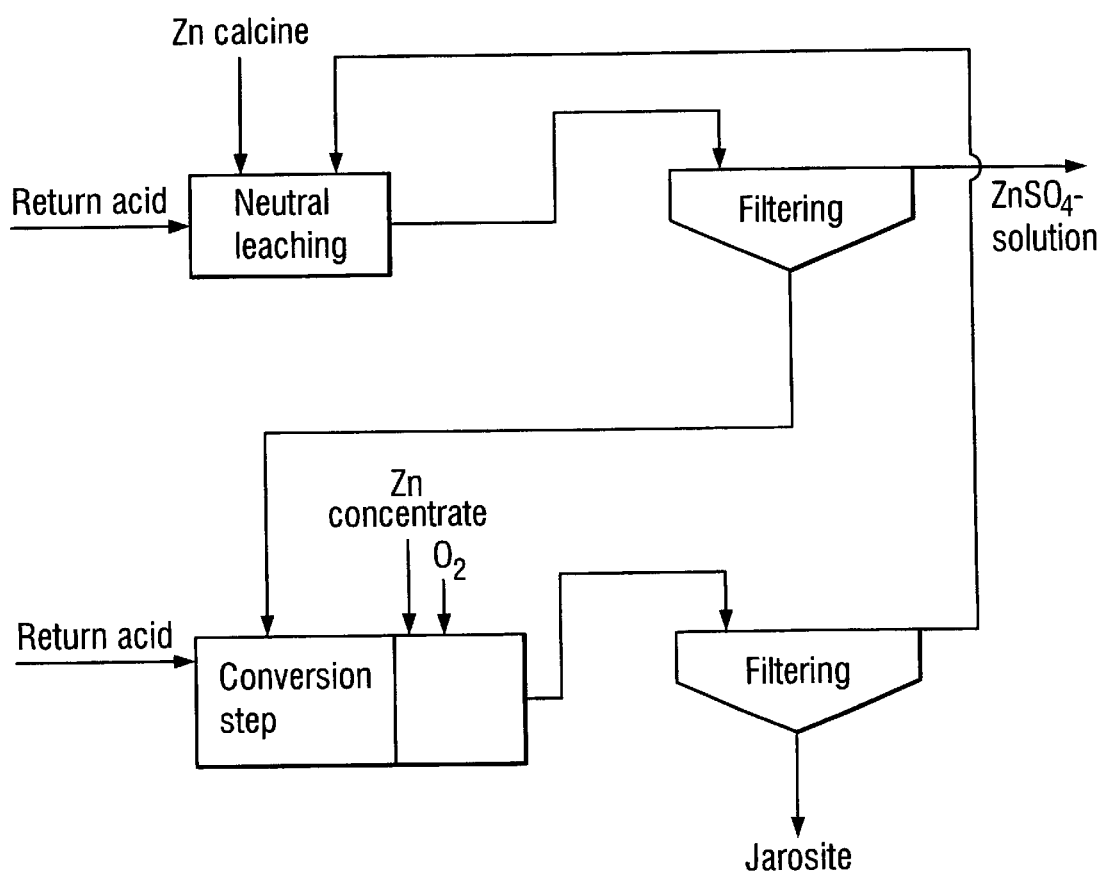
Figure 3:
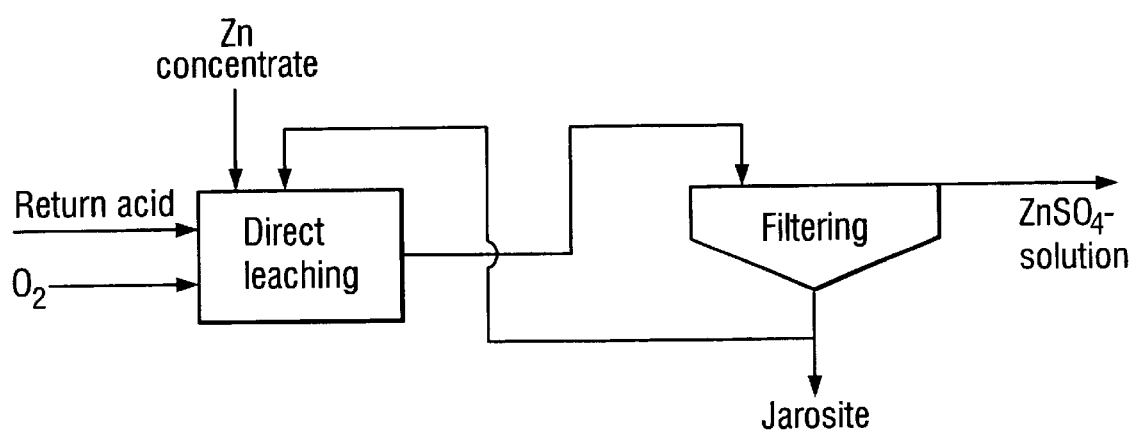

The invention is described in more detail with reference to the appended diagrams, where FIG. 1 illustrates a preferred embodiment of the invention, where the direct leaching of the concentrate is combined with the conversion process, FIG. 2 illustrates how the method according to the invention is combined with the jarosite precipitation of the conversion step, and FIG. 3 illustrates yet another preferred embodiment of the invention.

From FIG. 1 it is seen that part of the concentrate is still roasted, and the resulting calcine is conducted into neutral leaching, where the calcine is leached with the electrolysis return acid. The solution created in the neutral leaching and the precipitate are conducted to separation, and the obtained zinc sulfate solution is conducted, after purification, to electrolysis. The part that was left undissolved in the neutral leaching, i.e. the ferrites, are conducted into a conversion step, where the precipitate is leached with an acid solution obtained from electrolysis or some other suitable place, said acid solution typically containing 200 g/l $H_2SO_4$. With this acid solution, the sulfuric acid content of the conversion step is typically adjusted to be within the region 10–40 g/l, advantageously 20–30 g/l.

Usually the conversion step is carried out in several different reactors, but in order to be able to conduct unroasted zinc concentrate into the conversion step, it is advantageous to add to this step reactors whereto there is fed zinc concentrate and oxygen among the ferrite-jarosite precipitate. The concentrate can be fed to the first part of the step, but most advantageously it is fed to the middle part thereof, in a situation where the ferrite is dissolved and the jarosite has begun to precipitate. The solution-solids-separation takes place at the end of the step, in similar fashion as in the conventional conversion method. The feeding of the concentrate into the conversion step can be realized in the way described above, irrespective of the fact what stages were included in the leaching of the zinc calcine prior to the conversion step. Thus the neutral leaching may take place in several steps, or the leaching may also include some kind of strong-acid leaching prior to the conversion step, as is described with reference to FIG. 4 of the U.S. Pat. No. 3,959,437.

Lately the tendency has been more and more towards direct leaching of the zinc concentrate, because the sulfuric acid produced from the sulfuric oxide created in roasting is not particularly economical to manufacture: it has a poor market and it does not have a great sales value. The direct leaching of the concentrate can be advantageously combined with the conversion process. When thus combined, the method does not require new steps, but naturally new reactors must be added to the conversion step. This is described in FIG. 2. A method based on the use of calcine does not need oxygen, but oxygen is needed in the leaching of the concentrate. Thus the step needs new reactors, where the dispersion of oxygen to the slurry takes place.

The method according to the invention is simpler and more economical than the prior art methods described above. In the description above, we have introduced a preferred embodiment of the invention, where direct leaching is combined with a conversion process, but direct leaching can also be combined with a jarosite process, for instance after the reactors in jarosite precipitation. In a conventional jarosite process, the leaching of ferrites and the precipitation of iron as jarosite are carried out in separate process steps.

FIG. 3 illustrates an arrangement according to which the process in its simplest form can be completely stripped of the precipitation treatment and the connected leaching steps, and the zinc concentrate can be leached for instance with the return acid of electrolysis, and oxygen can be fed to the leaching. The created solution and precipitate are concentrated and filtered. Part of the precipitate is recirculated back to the leaching/precipitation step, where it serves as jarosite nuclei, but the major part of the precipitate is jarosite precipitate to be removed from circulation. The obtained zinc sulfate solution is conducted, after neutralization and solution purification, to electrolysis.

The invention is described in more detail with reference to the appended example, although it is natural that the method according to the invention can also be realized by means of other preferred embodiments than the one described in the example below. For instance a method according to FIG. 3 is advantageous when the process is not coupled to a conversion process. In this case the jarosite needed in the process is returned from the underflow of the thickening agent.

EXAMPLE

On pilot scale, there was run a process corresponding to FIG. 2. Into the pilot reactor, there was taken 75 m$^3$ slurry from the slurry obtained from the conversion step of a production-scale plant, which slurry was going to a thickener and to solution-solids-separation, whereafter the solids are removed from the process. Into the reactor there was added 5.0 t zinc concentrate, with an analysis: 52% Zn, 4.5% Fe and 32% S. The reactor was mixed, and oxygen gas was fed in. The temperature was maintained at about 95° C., and the solution contained about 5 g/l $NH_4$. The proceeding of the experiment is shown in the results given in table 1.

| EXPERIMENT | TIME h | SOLUTION g/l | | | | PRECIPITATE % | | |
|---|---|---|---|---|---|---|---|---|
| | | Zn | $Fe^{3+}$ | $Fe_{tot}$ | $H_2SO_4$ | Zn | Fe | $S_{elem}$ |
| Conversion slurry + $H_2SO_4$ | 0 | 79.0 | 13.3 | 13.4 | 73.8 | 2.4 | 20.5 | |
| Conversion slurry + | 2 | 85.0 | 5.6 | 17.1 | 62.7 | 20.3 | 14.2 | |

-continued

| EXPERIMENT | TIME h | SOLUTION g/l | | | | PRECIPITATE % | | |
|---|---|---|---|---|---|---|---|---|
| | | Zn | $Fe^{3+}$ | $Fe_{tot}$ | $H_2SO_4$ | Zn | Fe | $S_{elem}$ |
| Zn-concentrate | 5 | 91.0 | 3.6 | 22.7 | 47.0 | 26.8 | 10.7 | |
| | 8 | 95.0 | 5.7 | 22.0 | 34.8 | 18.6 | 11.4 | |
| | 12 | 103.0 | 6.7 | 17.5 | 20.7 | 8.2 | 15.7 | |
| | 16 | 107.0 | 5.1 | 9.5 | 19.9 | 8.4 | 17.3 | |
| | 20 | 110.0 | 3.7 | 7.6 | 21.1 | 1.4 | 22.0 | |
| | 24 | 113.0 | 3.0 | 4.1 | 21.0 | 1.4 | 22.0 | |
| | 28 | 115.0 | 3.4 | 3.2 | 21.7 | 1.2 | 22.0 | 21.0 |

The solids in the conversion slurry contained 2.4% Zn, which is lost in a normal conversion process, because this is the final leach residue. The final precipitate of the pilot process run in the example contained only 1.2% Zn, which indicates that the zinc concentrate is dissolved, and also that zinc is dissolved from the original jarosite precipitate, too. Another typical feature of the method is that the quantity of iron in the solutions is dramatically reduced. This is very advantageous for the neutral leaching step, which only tolerates a limited number of recirculated iron from the conversion step. As the iron load is now reduced, the zinc production can be increased by leaching zinc concentrate without having to make changes in the neutral leaching step.

What is claimed is:

1. A method for leaching zinc concentrate in atmospheric conditions in the presence of trivalent iron, comprising feeding the zinc concentrate and a sulfuric acid solution into a leaching step under atmospheric conditions where in addition to trivalent iron, there are also jarosite nuclei, where the sulfuric acid content in the leaching step is maintained within 10–40 g/l, and the temperature in the leaching step is maintained between 80° C. and the boiling point of the sulfuric acid solution, and where to the leaching step there is fed oxygen, so that the zinc concentrate is dissolved and the iron is precipitated as jarosite, wherein a portion of the jarosite precipitate is recirculated to the leaching step to form the jarosite nuclei in the leaching step.

2. A method according to claim 1, wherein zinc calcine ferrites and precipitated dissolved iron as jarosite are fed into the leaching step and when the ferrites are dissolved and the jarosite has begun to precipitate, the zinc concentrate and the oxygen are fed into the leaching step.

3. A method according to claim 1, wherein before the zinc concentrate is fed into the leaching step, zinc calcine is leached with a sulfuric acid solution in a neutral leaching step to produce a zinc sulfate solution and a precipitate containing ferrites, the ferrites are first leached in a ferrite leaching step and thereafter the iron is precipitated as jarosite in a separate step, and the zinc concentrate is fed into the leaching step at the end of the separate jarosite precipitation step.

* * * * *